US012631792B2

(12) United States Patent
Hsieh et al.

(10) Patent No.: US 12,631,792 B2
(45) Date of Patent: May 19, 2026

(54) ANTI-GLARE LAYER AND DISPLAY DEVICE HAVING THE SAME

(71) Applicant: AUO Corporation, Hsin-Chu (TW)

(72) Inventors: Shang-Wei Hsieh, Hsin-Chu (TW); Ya-Chen Kao, Hsin-Chu (TW); Ken-Yu Liu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 285 days.

(21) Appl. No.: 18/379,864

(22) Filed: Oct. 13, 2023

(65) Prior Publication Data

US 2024/0295673 A1     Sep. 5, 2024

(30) Foreign Application Priority Data

Feb. 22, 2023    (TW) ................................. 112106536

(51) Int. Cl.
*G02B 1/11* (2015.01)
(52) U.S. Cl.
CPC ..................................... *G02B 1/11* (2013.01)
(58) Field of Classification Search
None
See application file for complete search history.

(56) References Cited

FOREIGN PATENT DOCUMENTS

| TW | 201606357 A | 2/2016 | |
| TW | 202104127 A | 2/2021 | |
| WO | WO-2012124323 A1 * | 9/2012 | ....... G02F 1/133606 |

OTHER PUBLICATIONS

TIPO has issued the Office Action for the corresponding Taiwan application on Nov. 30, 2023.

* cited by examiner

*Primary Examiner* — Shan Liu
(74) *Attorney, Agent, or Firm* — WPAT, PC

(57)             ABSTRACT

An anti-glare layer and a display device are provided. The anti-glare layer includes a bottom surface and a microstructure surface opposite to each other. The microstructure surface has a plurality of microstructures disposed thereon. In the normal direction perpendicular to the bottom surface, a virtual reference plane parallel to the bottom surface passes through the points of the microstructures closest to the bottom surface, and k virtual sectional planes are sequentially defined along the normal direction from the virtual reference plane on the side opposite to the bottom surface. The virtual sectional planes are spaced apart from each other by a gap D. The cross-sectional area sum of the microstructures on the n-th virtual sectional plane, the mean included angle of the microstructures at intersection with the n-th virtual sectional plane, and the area of the bottom surface satisfy a certain relation to improve the brightness of large viewing angles as well as user experience, while taking account of an anti-glare effect.

14 Claims, 2 Drawing Sheets

310

310

$C_{n+1}$ $C_n$

ANTI-GLARE LAYER AND DISPLAY DEVICE HAVING THE SAME

CROSS REFERENCE TO RELATED APPLICATION

The present application claims the benefit of Taiwan Patent Application No. 112106536, filed on Feb. 22, 2023. The entirety of the mentioned above patent application is hereby incorporated by reference herein and made a part of this specification.

BACKGROUND OF THE INVENTION

1. Field of the Invention

The present invention relates to an anti-glare layer and a display device including the anti-glare layer. Specifically, the present invention relates to an anti-glare layer for improving the brightness of large viewing angles, and a display device including the anti-glare layer.

2. Description of the Prior Art

Flat and curved panel display devices have been widely applied in various electronic apparatuses such as mobile phones, personal wearable equipment, television sets, vehicular hosts, personal computers, digital cameras and handheld game consoles. However, in order to improve the user's visual experience, the industry is still constantly improving the optical performance of display devices.

For example, the display face of some display devices may generate glare due to external ambient light during use. In most usage situations, glare often causes visual discomfort to some users and affects the optical performance of displayed images. In order to solve this problem, some conventional display devices have a matte layer with a matte surface on the display face to reduce glare. However, the display brightness when viewed at large viewing angles is often reduced significantly, which will make the image displayed on the display device difficult to view at large viewing angles, thereby affecting the user experience.

SUMMARY OF THE INVENTION

To solve the foresaid problem, one embodiment of the present invention provides an anti-glare layer comprising a bottom surface and a microstructure surface opposite to each other, wherein the microstructure surface has a plurality of microstructures. In the normal direction perpendicular to the bottom surface, a virtual reference plane parallel to the bottom surface passes through the points of the microstructures closest to the bottom surface, and k virtual sectional planes are sequentially defined along the normal direction from the virtual reference plane on the side opposite to the bottom surface. The virtual sectional planes are spaced apart from each other by a gap D (in μm), wherein the microstructure surface satisfies the condition below:

$$\sum_{n=1}^{k}\left[A_n\times\left(\frac{\theta_n}{0.1\text{ deg}}\right)^2\right]\div A_{total} < \frac{35\ \mu m}{D}$$

wherein $A_n$ (in μm²) is the cross-sectional area sum of the microstructures on the n-th virtual sectional plane, $\theta_n$ is the mean included angle of the microstructures at intersection with the n-th virtual sectional plane, and $A_{total}$ (in μm²) is the area of the bottom surface.

Another embodiment of the present invention provides a display device comprising a display panel and an anti-glare layer as described above. The display panel includes a display face having the anti-glare layer disposed thereon.

The anti-glare layer and display device according to embodiments of the present invention can improve the brightness of large viewing angles to enhance user experience, while taking account of an anti-glare effect.

BRIEF DESCRIPTION OF THE APPENDED DRAWINGS

DETAILED DESCRIPTION OF THE INVENTION

Figure 1:
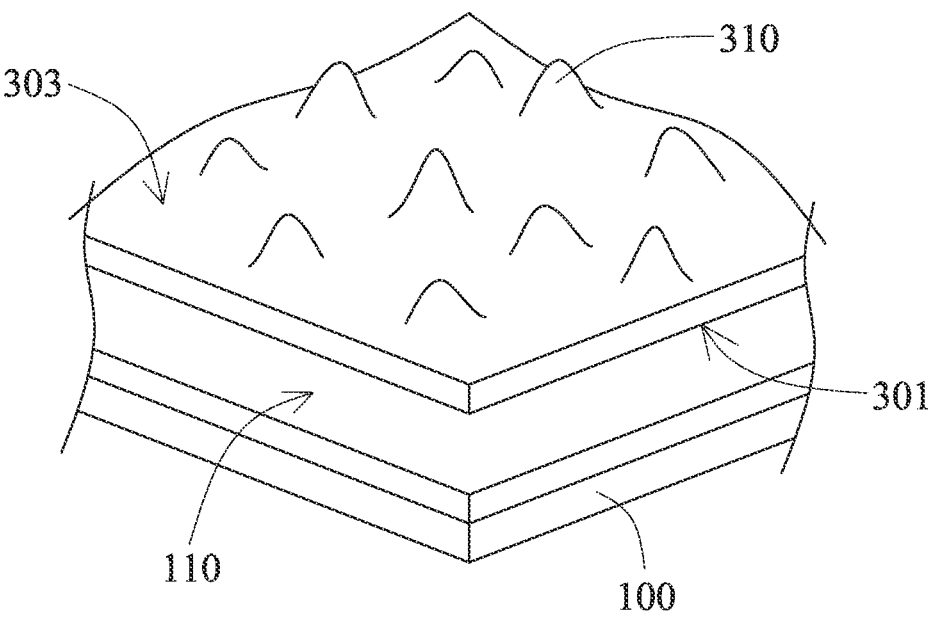
FIG. 1 is a schematic diagram of the display device according to one embodiment of the present invention.

Various embodiments will be described below, and those of ordinary skill in the art can easily understand the spirits and principles of the present invention referring to this specification accompanied by the drawings. However, although some particular embodiments will be specifically illustrated herein, these embodiments are only exemplary, and are not to be regarded as limiting or exhaustive in all respects. Therefore, for those of ordinary skill in the art, various changes and modifications to the present invention should be obvious and can be easily achieved without departing from the spirits and principles of the present invention.

In the appended drawings, thicknesses of layers, films, panels, regions and so on are enlarged for clarity. Throughout this specification, the same reference numerals refer to the same elements. It will be understood that when an element such as layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, "connected" may refer to a physical and/or electrical connection. Furthermore, "electrically connected" or "coupled" may refer to the existence of other elements between the two elements.

The terms used herein are to describe particular embodiments only and are not limiting. As used herein, the singular forms "a", "an", and "the" are intended to include the plural forms, including "at least one" unless the content dictates otherwise. "Or" means "and/or". As used herein, the term "and/or" includes any and all combinations of one or more of the associated listed items. It will also be understood that, when used in this specification, the terms "comprising" and/or "including" designate the presence or addition of stated features, regions, integers, steps, operations, elements, and/or components, but do not exclude the presence or addition of one or more other features, regions, integers, steps, operations, elements, components and/or combinations thereof.

Exemplary embodiments are described herein with reference to cross-sectional diagrams that are schematic illustrations of idealized embodiments. Accordingly, variations from the illustrated shapes as a result, for example, of manufacturing techniques and/or tolerances are to be expected. Thus, embodiments described herein should not be construed as limited to the particular shapes of regions as illustrated herein but are to include heights in shapes that result, for example, from manufacturing. For example, a region shown or described as flat may typically have rough and/or non-linear features. Additionally, acute corners shown may be rounded. Thus, the regions shown in the figures are schematic in nature, and their shapes are not intended to illustrate the precise shape of regions, and are not intended to limit the scope of the claims.

The present invention provides a display device and an anti-glare layer disposed thereon. The display device may preferably be a computer display, a television set, a monitor, a vehicular host and so on. Furthermore, the display device may also be utilized on other electronic apparatuses, e.g., as a display screen of a mobile phone, a digital camera, a handheld game console and so on.

As shown in FIG. 1, in one embodiment of the present invention, a display device includes a display panel 100 and an anti-glare layer 300. The display panel 100 can be a liquid crystal display panel, OLED display panel, miniLED display panel, electrophoretic display panel or other types of display panel. The anti-glare layer 300 is preferably attached to a display face 110 of the display panel 100 to provide an optical effect of reduced glare.

Figure 2:
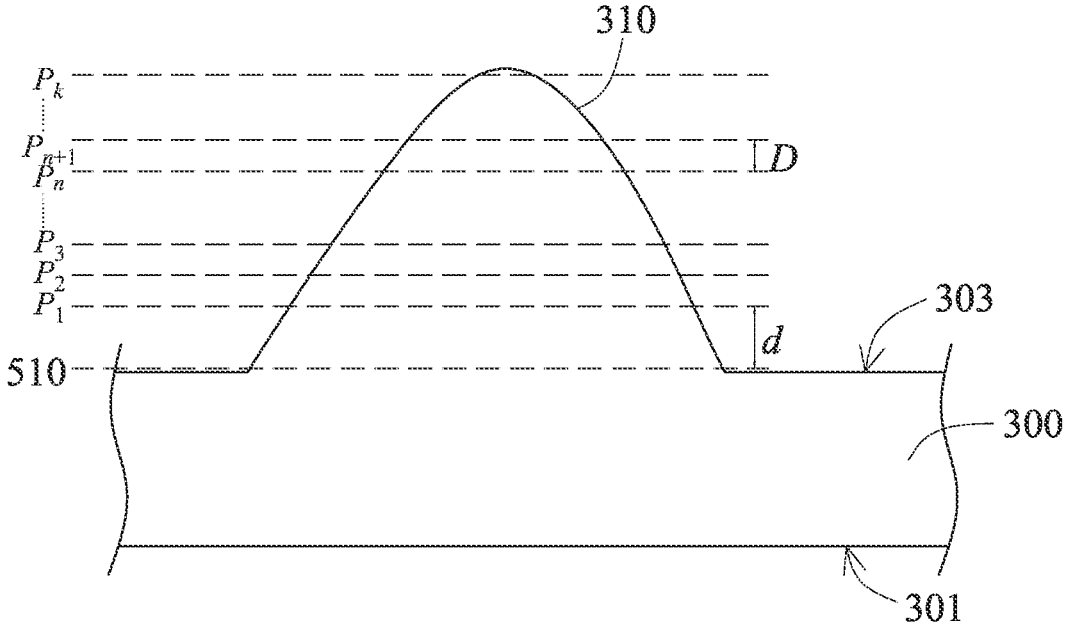
FIG. 2 is a cross-sectional schematic diagram of the anti-glare layer according to one embodiment of the present invention.

FIG. 2 is a cross-sectional schematic diagram of the anti-glare layer 300. In the embodiment as shown in FIG. 2, the anti-glare layer 300 has a bottom surface 301 and a microstructure surface 303 opposite to each other. The bottom surface 301 faces toward the display face 110, and is preferably attached onto the display face 110. The microstructure surface 303 has a plurality of microstructures 310 thereon; nevertheless, only one single microstructure 310 is illustrated for convenience. As shown in FIG. 1 and FIG. 2, the microstructures 310 are preferably shaped like a conical structure with narrow top and wide bottom, and have irregular heights, sectional shapes and distribution densities.

As shown in FIG. 2, a fictitious virtual reference plane 510 may be defined. Preferably, the virtual reference plane 510 passes through the lowest points of the microstructures 310, namely, the points in each microstructure closest to the bottom surface 301, in a direction perpendicular to the normal direction Z of the bottom surface 301. The virtual reference plane 510 is preferably perpendicular to the normal direction Z and parallel to the bottom surface 301. k fictitious virtual sectional planes $P_1$, $P_2$, . . . , $P_k$ are defined on the side of the virtual reference plane 510 opposite to the bottom surface 301. These virtual sectional planes $P_1$, $P_2$, . . . , $P_k$ are sequentially arranged from a predefined location apart from the virtual reference plane 510 in a direction heading away from the virtual reference plane 510, namely, along the normal direction Z. The virtual sectional planes $P_1$, $P_2$, . . . , $P_k$ are preferably perpendicular to the normal direction Z and parallel to each other. Furthermore, adjacent virtual sectional planes $P_1$, $P_2$, . . . , $P_k$ are spaced apart from each other by a gap D (in μm) in the normal direction Z; namely, a gap D exists between the n-th virtual sectional plane $P_n$ and the n+1-th virtual sectional plane $P_{n+1}$. In this embodiment, the gap D is 0.5 μm; however, in other embodiments, the gap D may be 0.25 μm or other suitable lengths.

Preferably, the quantity k of virtual sectional planes satisfies the formula below:

$$5 \le k \le 12$$

Furthermore, the distance between the k-th virtual sectional plane $P_k$ and the point of a microstructure 310 farthest from the bottom surface 301 (i.e., the point of highest elevation on the microstructure surface 303) in the normal direction is smaller than the gap D, to ensure that each virtual sectional plane intersects at least a portion of the microstructures 310. According to the foresaid relation, an appropriate gap D may be determined based on the distance between the highest point and the lowest point of the microstructures 310 accompanied by the formula above.

In this embodiment, a distance d between a first virtual sectional plane $P_1$ closest to the virtual reference plane 510 and the virtual reference plane 510 is two times the gap D; namely, when the gap D is 0.5 μm, the distance between the first virtual sectional plane $P_1$ and the virtual reference plane 510 will be 1 μm. Since surfaces of lower portions of the microstructures 310 barely affect the optical effect, the influence of such portions on the following evaluation may be reduced. However, in other embodiments, the distance between the first virtual sectional plane $P_1$ and the virtual reference plane 510 may be other values, or the first virtual sectional plane $P_1$ itself may be taken as the virtual reference plane 510.

After defining the foresaid virtual reference plane 510 and the virtual sectional planes $P_1$, $P_2$, . . . , $P_k$, the structural property of the microstructure surface 303 can be designed. Specifically, the structural property indicator of the microstructure surface 303 can be made to satisfy the condition below:

$$\text{structural property indicator} \sum\nolimits_{n=1}^{k}\left[A_n \times \left(\frac{\theta_n}{0.1 \text{ deg}}\right)^2\right] \div A_{total} < \frac{35 \ \mu\text{m}}{D}$$

wherein $A_n$ (in μm²) is the cross-sectional area sum of the microstructures 310 on the n-th virtual sectional plane $P_n$, $\theta_n$ is the mean included angle of the microstructures 310 at intersection with the n-th virtual sectional plane $P_n$, and $A_{total}$ (in μm²) is the area of the bottom surface 301.

With the above structural property, the microstructure surface 303 will be able to maintain the large viewing angle performance while providing an anti-glare effect, thereby improving the problem of significant reduction in large viewing angle brightness caused by conventional anti-glare designs.

Figure 3:
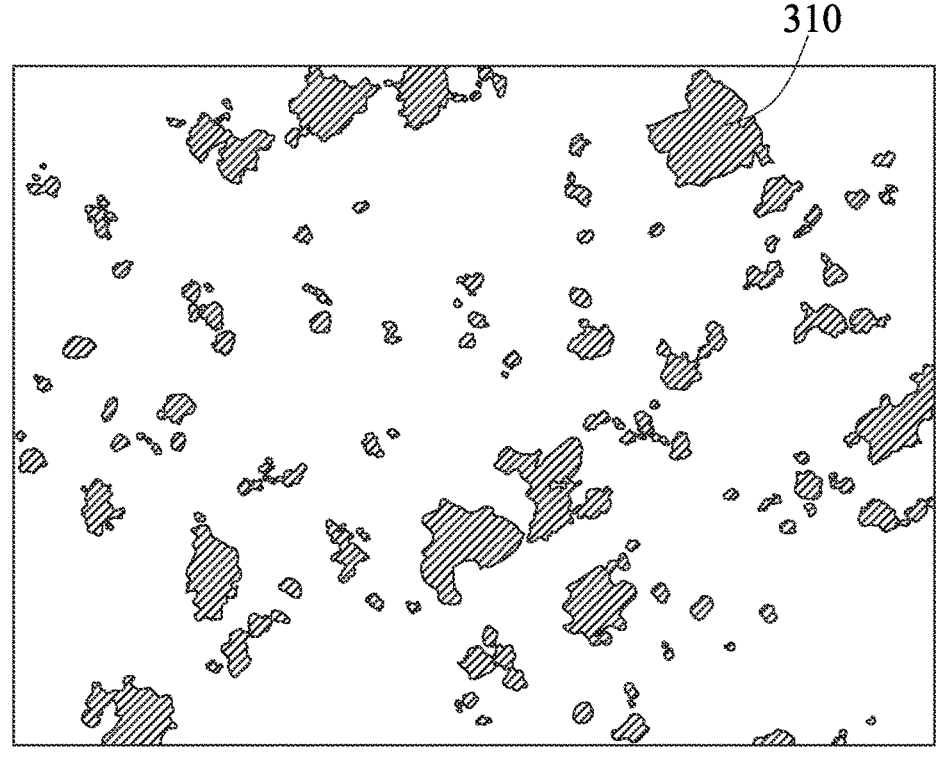
FIG. 3 is image data of an exemplary virtual sectional plane.

FIG. 3 shows image data of section shape and distribution of various microstructures 310 on an exemplary n-th virtual sectional plane $P_n$, wherein regions with hatching are section ranges of the microstructures 310. In this embodiment, the cross-sectional area sum $A_n$ can be calculated from the proportion of the pixel number covered by section ranges of the microstructures 310 in the total pixel number of the entire image. Furthermore, when interpreting the images, boundary pixels of the microstructures 310 can be identified by means of horizontal and vertical scanning, and then the boundaries of section ranges of the microstructures 310 are constructed based on these boundary pixels to calculate the cross-sectional area sum. However, in different embodiments, values of the cross-sectional area sum $A_n$ or other physical quantities with similar meaning can also be obtained in other ways.

In one embodiment, the mean included angle $\theta_n$ can be obtained by the relation formula below:

$$\theta_n = \tan^{-1}\left(\frac{D}{\Delta x}\right), \text{ and }$$

$$\Delta x = \frac{\sqrt{A_n} - \sqrt{A_{n+1}}}{2}.$$

Figure 4:
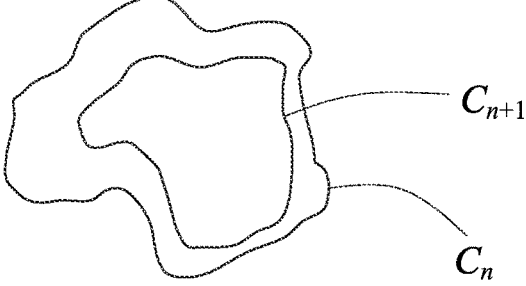
FIG. 4 is an overlay schematic diagram of section ranges of microstructures on adjacent virtual sectional planes.

Specifically, as shown in FIG. 4, the cross-sectional area sums $A_n$ and $A_{n+1}$ corresponding to respective sections $C_n$ and $C_{n+1}$ of a microstructure 310 on the virtual sectional plane $P_n$ and the adjacent virtual sectional planes $P_{n+1}$ can be appropriately processed in combination with the gap D to reflect the estimate mean included angles of the slopes of the microstructure surface 303 at different elevation segments. With this setting, time may be further saved and practicability enhanced for evaluation and adjustment of the microstructure surface 303.

Furthermore, to achieve an anti-glare effect, design of the microstructures 310 on the microstructure surface 303 should satisfy certain structural properties. In one embodiment for example, the microstructure surface 303 has an arithmetic mean height Ra and a kurtosis Rku. An exemplary definition of the arithmetic mean height Ra may be the average absolute value, along a sampling length, of a roughness profile of the microstructure surface 303: an exemplary definition of the kurtosis Rku may be the dimensionless fourth power of the roughness profile divided by the fourth power of the root mean square deviation. The arithmetic mean height Ra and kurtosis Rku of the microstructure surface 303 preferably satisfy the relation formulated below:

$$Ra \times Rku \geq 0.95 \ \mu m$$

In another embodiment, the kurtosis Rku of the microstructure surface 303 should satisfy the relation formulated below:

$$2.36 \leq Rku \leq 4.35$$

In another embodiment, the arithmetic mean height Ra of the microstructure surface 303 should satisfy the relation formulated below:

$$0.39 \ \mu m \leq Ra \leq 0.42 \ \mu m$$

Related characteristics like the above arithmetic mean height Ra and kurtosis Rku of the microstructure surface 303 may be designed in combination with the structural property indicator of the microstructure surface 303 shown in foresaid embodiments to maintain a balance between anti-glare capability and large viewing angle brightness. In other words, by the foresaid structural property of the microstructure surface 303, the anti-glare layer can maintain good anti-glare capability while increasing display brightness in large viewing angles.

The above description contains only some preferred embodiments of the present invention. It should be noted that various changes and modifications can be made to the present invention without departing from the spirits and principles of the present invention. Those of ordinary skill in the art should understand that the present invention is defined by the appended claims, and under the spirits of the present invention, all possible replacements, combinations, modifications, diversions and other changes would not exceed the scope of the present invention defined by the appended claims.

What is claimed is:
1. An anti-glare layer, comprising:
a bottom surface; and
a microstructure surface opposite to the bottom surface and having a plurality of microstructures; wherein:
in a normal direction perpendicular to the bottom surface, a point of the microstructures closest to the bottom surface passes through a virtual reference plane parallel to the bottom surface, and k virtual sectional planes are parallel to each other and sequentially defined along the normal direction from the virtual reference plane on the side opposite to the bottom surface, adjacent virtual sectional planes being spaced apart from each other by a gap D (in μm),
wherein the microstructure surface satisfies the condition below:

$$\sum_{n=1}^{k}\left[A_n \times \left(\frac{\theta_n}{0.1 \text{ deg}}\right)^2\right] \div A_{total} < \frac{35 \ \mu m}{D}$$

wherein $A_n$ (in $\mu m^2$) is a cross-sectional area sum of the microstructures on the n-th virtual sectional plane,
$\theta_n$ is a mean included angle of the microstructures at intersection with the n-th virtual sectional plane,
$A_{total}$ (in $\mu m^2$) is the area of the bottom surface,
the gap D is 0.5 μm; and
$5 \leq k \leq 12$.
2. The anti-glare layer of claim 1, wherein:
in the normal direction, a distance d between the virtual reference plane and a closest first virtual sectional plane is two times the gap D.
3. The anti-glare layer of claim 1, wherein:

$$\theta_n = \tan^{-1}\left(\frac{D}{\Delta x}\right), \text{ and }$$

$$\Delta x = \frac{\sqrt{A_n} - \sqrt{A_{n+1}}}{2}.$$

4. The anti-glare layer of claim 1, wherein a distance between the k-th virtual sectional plane and a point of the microstructures farthest from the bottom surface in the normal direction is smaller than the gap D.
5. The anti-glare layer of claim 1, wherein the microstructure surface has an arithmetic mean height Ra and a kurtosis Rku satisfying the relation formulated below:

$$Ra \times Rku \geq 0.95 \ \mu m.$$

6. The anti-glare layer of claim 1, wherein the microstructure surface has an arithmetic mean height Ra satisfying the relation formulated below:

$$0.39 \ \mu m \leq Ra \leq 0.42 \ \mu m.$$

7. The anti-glare layer of claim 1, wherein the microstructure surface has a kurtosis Rku satisfying the relation formulated below:

$$2.36 \leq Rku \leq 4.35.$$

8. A display device, comprising:
a display face having disposed thereon an anti-glare layer comprising:
a bottom surface; and
a microstructure surface opposite to the bottom surface and having a plurality of microstructures; wherein:
in a normal direction perpendicular to the bottom surface, a point of the microstructures closest to the bottom surface passes through a virtual reference plane parallel to the bottom surface, and k virtual sectional planes are parallel to each other and sequentially defined along the normal direction from the virtual reference plane on the side opposite to the bottom surface, adjacent virtual sectional planes being spaced apart from each other by a gap D (in μm),
wherein the microstructure surface satisfies the condition below:

$$\sum_{n=1}^{k}\left[A_n \times \left(\frac{\theta_n}{0.1 \ \text{deg}}\right)^2\right] \div A_{total} < \frac{35 \ \mu m}{D}$$

wherein $A_n$ (in μm$^2$) is a cross-sectional area sum of the microstructures on the n-th virtual sectional plane,
$\theta_n$ is a mean included angle of the microstructures at intersection with the n-th virtual sectional plane,
$A_{total}$ (in μm$^2$) is the area of the bottom surface, the gap D is 0.5 μm; and
5≤k≤12.

9. The display device of claim 8, wherein:
in the normal direction, a distance d between the virtual reference plane and a closest first virtual sectional plane is two times the gap D.

10. The display device of claim 8, wherein:

$$\theta_n = \tan^{-1}\left(\frac{D}{\Delta x}\right), \text{ and}$$

$$\Delta x = \frac{\sqrt{A_n} - \sqrt{A_{n+1}}}{2}.$$

11. The display device of claim 8, wherein a distance between the k-th virtual sectional plane and a point of the microstructures farthest from the bottom surface in the normal direction is smaller than the gap D.

12. The display device of claim 8, wherein the microstructure surface has an arithmetic mean height Ra and a kurtosis Rku satisfying the relation formulated below:

$$Ra \times Rku \geq 0.95 \ \mu m.$$

13. The display device of claim 8, wherein the microstructure surface has an arithmetic mean height Ra satisfying the relation formulated below:

$$0.39 \ \mu m \leq Ra \leq 0.42 \ \mu m.$$

14. The display device of claim 8, wherein the microstructure surface has a kurtosis Rku satisfying the relation formulated below:

$$2.36 \leq Rku \leq 4.35.$$

*   *   *   *   *